Oct. 20, 1959
R. H. SHEPPARD
2,909,076
POWER STEERING DEVICE
Filed Sept. 9, 1953
2 Sheets-Sheet 1
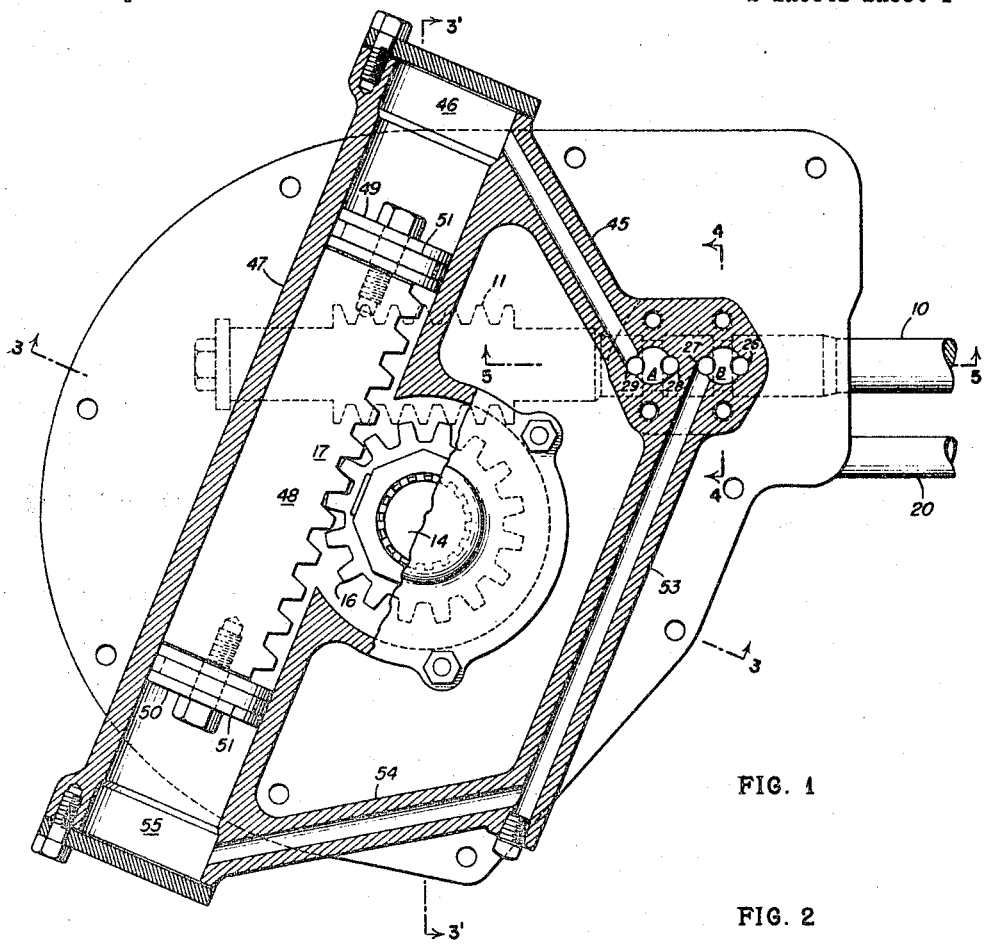
FIG. 1
FIG. 2
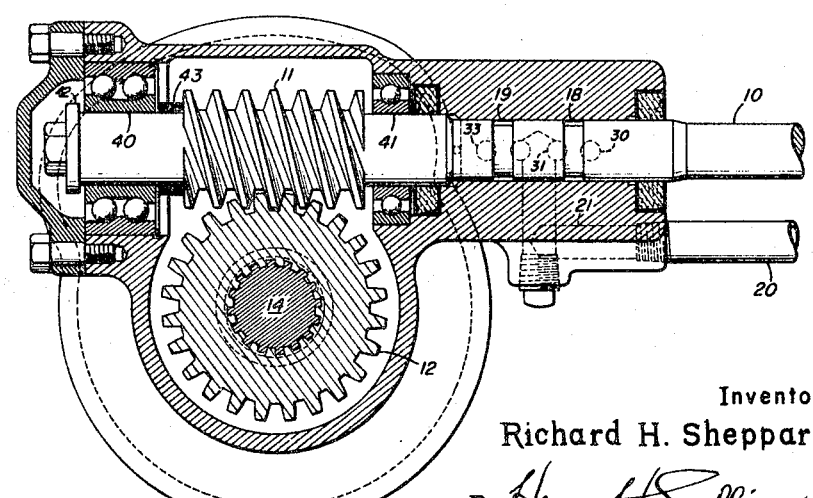
Inventor:
Richard H. Sheppard
By Henry H. Snelling
his Attorney Oct. 20, 1959  R. H. SHEPPARD  2,909,076
POWER STEERING DEVICE
Filed Sept. 9, 1953  2 Sheets-Sheet 2
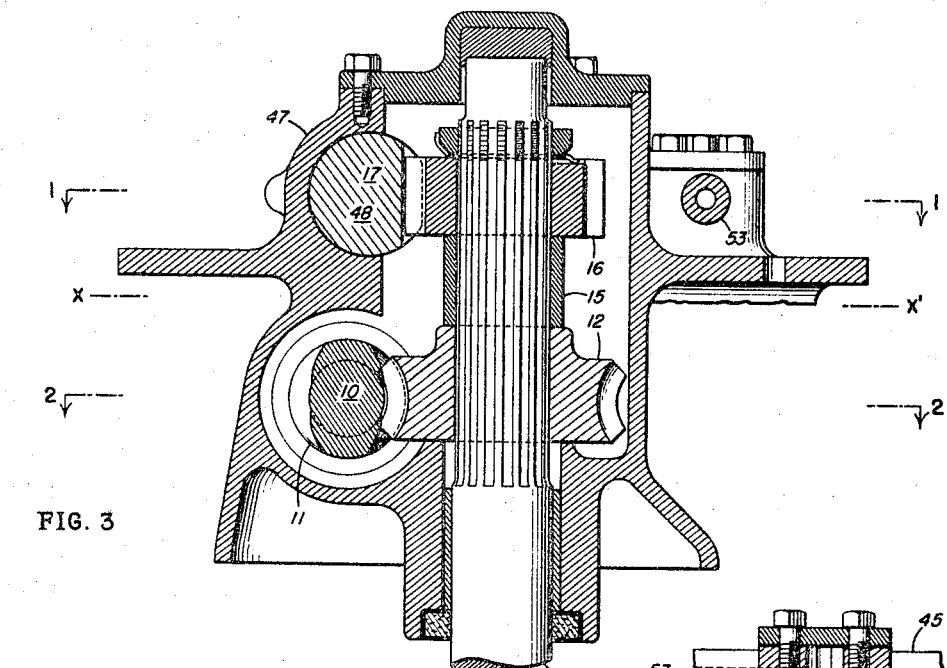
FIG. 3
FIG. 5
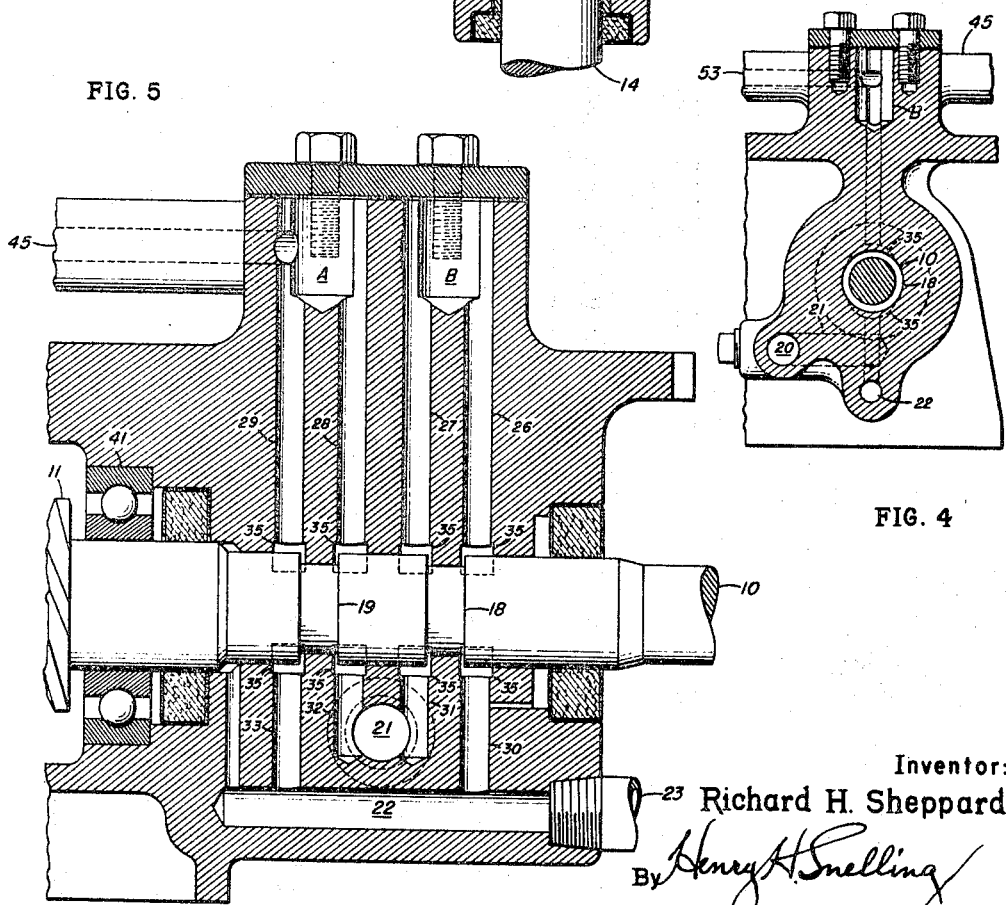
FIG. 4
Inventor:
Richard H. Sheppard
By Henry H. Snelling
his Attorney

United States Patent Office 2,909,076
Patented Oct. 20, 1959

2,909,076

POWER STEERING DEVICE

Richard H. Sheppard, Hanover, Pa.

Application September 9, 1953, Serial No. 379,146

2 Claims. (Cl. 74—388)

This invention relates to power steering units primarily for use on vehicles of the farm tractor type and has for its principal object the provision of a device of the kind which can be produced at a relatively low cost and still have many of the advantages of power steering systems of expensive arrangements.

A further object of the invention is to provide a power steering device which is interchangeable with the present day mechanical device and will hold a tractor in straight line movement against the lateral urge of ruts, stones or a bump.

Other objects of the invention include the provision of a manual steering shaft which may move axially and yet be free from slip joints such, for instance, as a splined shaft; a power steering device built directly on the vertical power steering shaft; the combination of a rack and plunger in the hydraulic power cylinder; and the placing of two spaced pinions on the power steering shaft, one of the pinions meshing with a worm controlled by the operator and the other meshing with a rack hydraulically controlled by axial movement of the manual steering shaft.

In the drawings:

Figure 1 is a view of the steering device, partly in horizontal section and partly in plan, the plane of the section being indicated by the line 1—1 of Fig. 3.

Figure 2 is a horizontal section taken on the plane indicated by the line 2—2 of Figure 3.

Figure 3 is a vertical section of the steering device, the portion above the line x—x' being taken on the line 3—3 of Figure 1, and the portion below the line x—x' being taken on the line 3'—3' of Figure 1.

Figure 4 is a vertical section taken on the line 4—4 of Figure 1.

Figure 5 is an enlarged vertical section taken on the line 5—5 of Figure 1.

In Figure 1, 10 indicates the manual steering shaft which is connected by usual universal joints to the steering wheel itself, neither of these being shown. On the shaft 10 is a worm 11, meshing with a worm gear 12, splined on the power steering shaft 14, which is usually vertical. This shaft 14 at its lower end joins the proper mechanisms, for example, this shaft turns the front axle in the case of a row crop type or would turn a steering arm in the case of a wide axle tractor and it might or might not pivot the axle itself.

The vertical power steering shaft 14 carries a spur pinion 16 (Figure 1) meshing with a rack 17, the two pinions 12 and 16 being held in spaced relation as by the sleeve 15. The two pinions are each splined to the power shaft 14 and are locked in place, consequently moving as a unit at all times.

The shaft 10 forms the stem of a valve which controls the flow of a hydraulic fluid to operate the rack 17. For this purpose the shaft 10 is provided with annular grooves 18 and 19 which control the flow of fluid from entry port 20 through entry passage 21 to discharge passage 22 returning the fluid through port 23 to a reservoir. The fluid is pumped through entry port 20 at a speed of perhaps two or three gallons a minute with a normal working pressure of from 300 to 400 pounds per square inch. To provide for travel of the fluid, the housing 25 has four parallel bores 26, 27, 28 and 29 which are coaxial with similar bores 30, 31, 32 and 33, the outer two of which, 30 and 33, communicate with the outlet discharge passageway 22 while the inner two 31 and 32 each communicate with the entry passageway 21. Each of the eight bores is provided with a crescent shaped enlargement adjacent the shaft 10. These enlargements are somewhat wider than the diameter of the eight bores, as best seen in Figures 4 and 5, and are each numbered 35 as they are all exactly alike, each extending through an arc of about 120°. The annular grooves 18 and 19 in normal position of the manual steering shaft 10 communicate with the crescent shaped enlargements 35 on each side so that in such normal position fluid may pass from bore 31 to bore 30 through groove 18 and also may pass to bores 26 and 27 through the same groove 18. Likewise fluid may pass from bore 32 to annular groove 19 and thence either to bore 33 or to bore 28 or 29.

In normal use therefore, with the tractor moving straight ahead, the fluid pump (not shown) forces oil or other fluid from entry port 20 to passageway 21, idly through bores 31 and 32, grooves 18 and 19, bores 30 and 33 to discharge port 23 and the reservoir. However, when the shaft 10 is manually turned, the worm 11, in constant engagement with the worm wheel 12, tending to rotate power shaft 14, slides freely in its bearings 40 and 41. Should the steering wheel (not shown) be jerked very suddenly, the shaft 10 would slide until one or the other of the two collars 42 and 43 struck the bearing 40. In normal use, however, these two collars are mere safety measures and neither collar would engage the bearing 40 except perhaps in case of hydraulic failure when after engagement of the collar with the bearing the power shaft 14 would be actuated by the worm 11 turning the worm wheel 12 fast to the power shaft; in other words, in case of hydraulic failure, the steering would be direct.

Referring now to Figure 5: Bores 26 and 27 communicate with port B while bores 28 and 29 communicate with port A, the latter communicating through passage 45 with the end 46 of cylinder 47. The rack 17 is a portion of a piston 48 having at its two ends the disks 49 and 50, having the usual sealing rings 51. The port B through passageways 53 and 54 communicates with the opposite end 55 of the cylinder 47 and the fluid thus engages the piston end disk 50.

The operation of the device is as follows: The driver desires to make a turn and consequently rotates the steering shaft 10 carrying the worm 11. Since the shaft 10 has a sliding fit in its bearings 40 and 41, it will tend to move axially in one direction or the other depending upon whether the steering wheel is turned to the right or to the left. Assuming, for example, that the shaft 10 is rotated in such direction as to move the worm 11 toward bearing 40 rather than toward bearing 41; the axial movement of the shaft 10, with its two annular grooves 18 and 19, will close ports 30 and 32 as well as ports 26 and 28 because the edges of the grooves 18 and 19 will move past the edges of the crescent shaped enlargements 35. At the same time this movement will increase the flow of fluid through the ports 31, 33, 27 and 29. Oil received from the pump through passageway 21 will therefore pass through bore 31, groove 18, bore 27, to port B and thence through passageways 53 and 54 to cylinder end 54, engaging the piston end 50. The piston being free to move, since the oil in chamber 46 discharges through passageway 45, port A, bore 29, groove 19, bore 33 and passageway 22 to the reservoir, will tend to move to the right, as seen in Figure 1, and the oil or other hydraulic fluid will continue to flow until the desired turn has been completed and shaft 10 once more returned to neutral position. During this return the power shaft 14 will turn the worm wheel 12 as a pinion acting upon worm 11 which momentarily acts as a rack. At the same time the spur pinion 16, always moving with the worm pinion 12, will return the rack 17 (piston 48) to center position.

Should the steering wheel be held steady but the tractor encounter an obstacle such as a stone or a bump or a rut, which would rotate the power shaft 14, no rotative movement of the shaft 10 would occur because the transfer of power to the worm 11 would move the worm 11 and the shaft 10 axially, the worm acting solely as a rack. The axial movement of shaft 10 would open four of the ports and close the other four, depending upon the direction of movement of the power steering shaft 14, for example: Ports 30, 32, 26 and 28 would be closed and the other four bores would be opened, thus oil would be directed to port B and would move the plunger 48 and through pinion 16 would restore the power steering shaft 14 to its proper position. At such time the shaft 10 is moved axially to return position through movement of the worm wheel 12 driving the worm 11 as a rack.

What I claim is:

1. In a power steering device for use with farm tractors, the combination with a manually operated steering shaft, of a worm on said shaft, a power steering shaft carrying a worm wheel in engagement with said worm, a spur pinion secured to the power steering shaft, a rack meshing with the spur pinion, a housing having a cylinder therein, a plunger slidable in the cylinder and carrying the rack and hydraulic means conveying fluid to either end of the piston as desired, said means including the manually controlled shaft as the stem of a distributing valve directing flow of the fluid.

2. In combination, a housing having a bore to receive a rotatable shaft and four alined passageways intersecting said bore at right angles, an annularly grooved manually operated shaft mounted in bearings for rotation in the housing and having an axial sliding fit in said bearings, a worm fast to said shaft, arcuate recesses in the housing communicating with the passageways and with the grooves so that each groove is located between two of the passageways, the two outside passageways leading to a reservoir and the two inside passageways receiving fluid under pressure, a power steering shaft in the housing, means including a worm and worm wheel connecting the two shafts for rotating the power steering shaft upon rotation of the manually operated shaft, and means mounted in part on the power steering shaft for rotating the power shaft by fluid under pressure from a chosen one of said passageways.

References Cited in the file of this patent

UNITED STATES PATENTS

| | | |
|---|---|---|
| 1,609,459 | Burnham | Dec. 7, 1926 |
| 1,627,712 | Schurch | May 10, 1927 |
| 1,872,714 | Farley | Aug. 23, 1932 |
| 2,213,271 | Davis | Sept. 3, 1940 |
| 2,587,495 | Mac Duff | Feb. 26, 1952 |
| 2,605,854 | Mac Duff | Aug. 5, 1952 |
| 2,627,187 | Davis | Feb. 3, 1953 |

FOREIGN PATENTS

| | | |
|---|---|---|
| 516,883 | Belgium | Jan. 31, 1953 |